United States Patent
Nakayama

(10) Patent No.: US 8,934,154 B2
(45) Date of Patent: Jan. 13, 2015

(54) IMAGE READING SYSTEM, IMAGE FORMING APPARATUS, AND METHOD OF REDUCING SKEW OF IMAGE

(71) Applicant: Satoshi Nakayama, Kanagawa (JP)

(72) Inventor: Satoshi Nakayama, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/102,630

(22) Filed: Dec. 11, 2013

(65) Prior Publication Data
US 2014/0185112 A1    Jul. 3, 2014

(30) Foreign Application Priority Data
Dec. 27, 2012 (JP) ................................. 2012-284969
May 7, 2013 (JP) ................................. 2013-097830

(51) Int. Cl.
| | | |
|---|---|---|
| H04N 1/04 | (2006.01) | |
| G06F 3/12 | (2006.01) | |
| H04N 1/00 | (2006.01) | |
| G02B 26/08 | (2006.01) | |
| G11B 7/00 | (2006.01) | |
| H04N 1/12 | (2006.01) | |

(52) U.S. Cl.
CPC .................................... *H04N 1/121* (2013.01)
USPC ........... 358/498; 358/406; 358/475; 358/497; 358/1.15; 358/474; 359/210.1; 369/112.24

(58) Field of Classification Search
USPC ............... 358/406, 475, 497, 1.15, 474, 498; 359/210.1; 369/112.24
See application file for complete search history.

(56) References Cited

U.S. PATENT DOCUMENTS

| | | | | |
|---|---|---|---|---|
| 5,933,248 | A * | 8/1999 | Hirata ............................ | 358/406 |
| 6,022,015 | A * | 2/2000 | Matsumoto .................... | 271/121 |
| 6,089,564 | A * | 7/2000 | Matsumoto et al. .......... | 271/161 |
| 6,224,051 | B1 * | 5/2001 | Nakayama et al. ........... | 271/115 |
| 7,090,177 | B2 * | 8/2006 | Milton et al. ............... | 248/180.1 |
| 7,342,869 | B2 * | 3/2008 | Mizuno ..................... | 369/112.24 |
| 2004/0047271 | A1 * | 3/2004 | Mizuno ..................... | 369/112.24 |
| 2009/0262618 | A1 * | 10/2009 | Nakamura .................. | 369/53.19 |
| 2010/0097646 | A1 * | 4/2010 | Yamawaki ................... | 358/1.15 |
| 2013/0176602 | A1 * | 7/2013 | Miyake et al. ................ | 358/474 |
| 2014/0078560 | A1 * | 3/2014 | Nagao et al. .................. | 358/474 |
| 2014/0146375 | A1 * | 5/2014 | Serizawa et al. ............ | 359/210.1 |

FOREIGN PATENT DOCUMENTS

JP    2004-333538    11/2004

* cited by examiner

*Primary Examiner* — Charlotte M Baker
*Assistant Examiner* — Rury Grisham
(74) *Attorney, Agent, or Firm* — Harness, Dickey & Pierce, P.L.C.

(57) ABSTRACT

An image forming apparatus includes an automatic document feeder to feed an original document downstream, a frame, an image reader to read the original document fed by the automatic document feeder, and an image reader mounting unit to hold the image reader thereon. The frame pivotally supports the image reader mounting unit. A parallelism adjusting unit is provided to adjust parallelism of the image reader mounting unit. The parallelism adjusting unit is disposed on a side opposite a pivoting center for the image reader mounting unit at a prescribed interval therefrom. The pivoting center is located near a reading reference point in the image reader, at which the image reader starts reading the original document in main and sub-scanning directions.

20 Claims, 13 Drawing Sheets

IMAGE READING SYSTEM, IMAGE FORMING APPARATUS, AND METHOD OF REDUCING SKEW OF IMAGE

CROSS-REFERENCE TO RELATED APPLICATION

This patent application is based on and claims priority pursuant to 35 U.S.C. §119 to Japanese Patent Application Nos. 2012-284969, filed on Dec. 27, 2012 and 2013-097830, filed on May 7, 2013 in the Japan Patent Office, the entire disclosures of which are hereby incorporated by reference herein.

BACKGROUND

1. Technical Field

This invention relates to an image forming apparatus equipped with an image reader and an automatic document feeder.

2. Related Art

In an image forming apparatus with an image reader that reads an image of an original document, an image reader-mounting unit is provided to mount the image reader thereon. In general, it is necessary to avoid skewing an image and a right angle of an image read by the image reader, and accordingly the image reader-mounting unit is designed to be as flat as possible. Recently, as image forming apparatuses have become lighter and thinner, a more accurate flatness than ever before is needed in a conventional image reader-mounting unit to carry the image reader thereon.

However, since such flatness is hardly ensured simply by enhancing precision of components (i.e., parts), a flatness adjusting unit is generally employed to obtain the necessary flatness. For example, to adjust the flatness of the image reader-mounting unit frame and solve the problems of the skewing and the right angle of the read image, the image reader-mounting unit is configured to be pivotable around an axis.

However, the relative positions of the pivoting center and an adjusting position (i.e., a power point) are not disclosed. Moreover, the arrangement is excessively sensitive and may be not suitable to execute fine adjustment.

Further, among various conventional image forming apparatuses with an automatic document feeder, the automatic document feeder is sometimes indirectly attached to the image reader. That is, the automatic document feeder is directly mounted on the frame of the image forming apparatus. In this case, it may be necessary to maintain relative positions of an image reading reference point for reading an original document fed by the automatic document feeder, on one hand, and the image reader, on the other, using a flatness-adjusting unit.

SUMMARY

Accordingly, one aspect of the present invention provides a novel image forming apparatus that includes an automatic document feeder to feed an original document downstream, a frame, and an image reader to read the original document fed by the automatic document feeder. An image reader-mounting unit is provided to hold the image reader thereon and is pivotally supported by the frame. A parallelism-adjusting unit is provided to adjust parallelism of the image reader-mounting unit. The parallelism-adjusting unit is disposed on a side opposite a pivoting center for the image reader-mounting unit at a prescribed interval. The pivoting center is located near a reading reference point in the image reader, at which the image reader starts reading the original document.

Another aspect of the present invention provides a novel method of reducing skew of an image read by an image reader from an original document by maintaining the relative positions of an image reading reference to start reading the original document and the image reader using a parallelism adjusting unit that adjusts parallelism of an image reader mounting unit in an image forming apparatus. The novel method is implemented in the image forming apparatus that includes a frame; an image forming unit to form a visible image based on the image read by the image reader from the original document; and an image reader mounting unit pivotally supported by the frame to hold the image reader thereon. The method comprising the steps of: operating the parallelism adjusting unit at a side opposite a pivoting center located in the image reader mounting unit near the reading reference point in the image reader at a prescribed interval; pivoting the image reader mounting unit substantially around the reading reference point of the image reader in a prescribed direction; securing the image reader mounting unit at a prescribed pivoting position in which the skew of the image is reduced; reading the original document; and forming a visible image based on the image read by the image reader from the original document.

BRIEF DESCRIPTION OF THE DRAWINGS

A more complete appreciation of the present invention and many of the attendant advantages thereof will be more readily obtained as substantially the same becomes better understood by reference to the following detailed description when considered in connection with the accompanying drawings, wherein.

DETAILED DESCRIPTION

Figure 1:
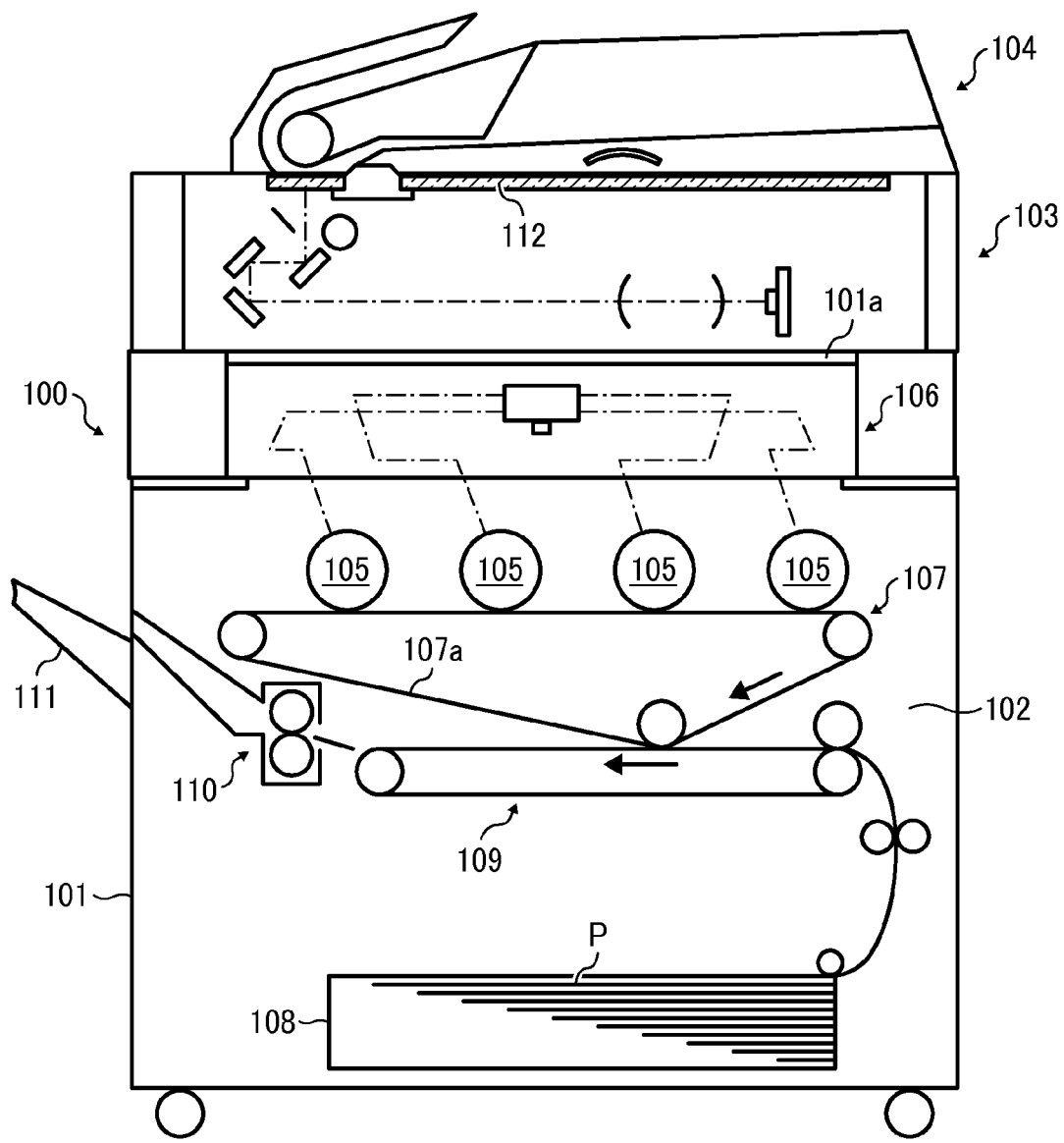
FIG. 1 is a schematic diagram illustrating an exemplary configuration of a color image forming apparatus employing an electrophotographic system as an image forming apparatus according to one embodiment of the present invention.

Referring now to the drawings, wherein like reference numerals designate identical or corresponding parts throughout the several views thereof and in particular to FIG. 1, a schematic configuration of a copier employing an electrophotographic system as an image forming apparatus is illustrated according to one embodiment of the present invention. As there shown, a color image forming apparatus 100 includes an image forming unit 102 placed within an apparatus body 101, an image reading unit 103 placed on the apparatus body 101, and an automatic document feeder (hereinafter, referred to as an ADF) 104. In the image forming unit 102, four drum-shaped photoconductive members 105-105 are horizontally placed in series to serve as image bearing members for forming four component color images of yellow, magenta, cyan, and black, respectively. Around each of the respective photoconductive members, charging, developing, cleaning, and charge removing systems are disposed to form a component toner image on each of the photoconductive members using an electrophotographic system. Above these four photoconductive members 105-105, there is positioned a writing unit 106 including multiple optical elements. The writing unit 106 has a well-known configuration and emits optical light beams to the respective photoconductive members and forms latent images on surfaces of the respective photoconductive members.

Below the four photoconductive members 105, an intermediate transfer unit 107 with an intermediate transfer belt 107a wound around more than one roller is positioned to serve as an intermediate transfer member. The intermediate transfer belt 107a is located partially opposite the four photoconductive members 105 to form four primary transfer sections between the intermediate transfer belt 107a and the respective photoconductive members. Thus, component color toner images formed on the photoconductive members are transferred onto the intermediate transfer belt 107a.

Below the intermediate transfer unit 107, a sheet-conveying device 109 is positioned substantially opposite the intermediate transfer belt 107a to convey a sheet P fed from the sheet-feeding unit 108 as a recording member. The sheet conveying device 109 forms a secondary transfer section opposed to the intermediate transfer belt 107a. Thus, the toner image primarily having been transferred onto the intermediate transfer belt 107a is secondarily transferred onto the sheet P in the secondary transfer section. The toner images thus transferred are fixed onto the sheet P by a fixing unit 110 placed downstream of the secondary transfer section in a sheet-conveying direction in which the sheet P is conveyed by the sheet-conveying device 109. The sheet P with the fixed toner image then exits and is loaded on a tray 111.

Above the writing unit 106, an original document placing table 112 is disposed on the top of the apparatus body 101 to place an original document thereon. The original document-placing table 112 is constituted by a transparent member such as glass, etc., and detachably fits into an opening 101a formed in the apparatus body 101. Thus, in this embodiment, the writing unit 106 is attachably detachable to and from the apparatus body 101 via the opening 101a.

Below the original document placing table 112 in an upper portion of the apparatus body 101, there is deployed an image reading unit 103 with an image reader to read an image of an original document placed on the original document placing table 112. Thus, above the image reading unit 103, there is placed the ADF 104.

Figure 2:
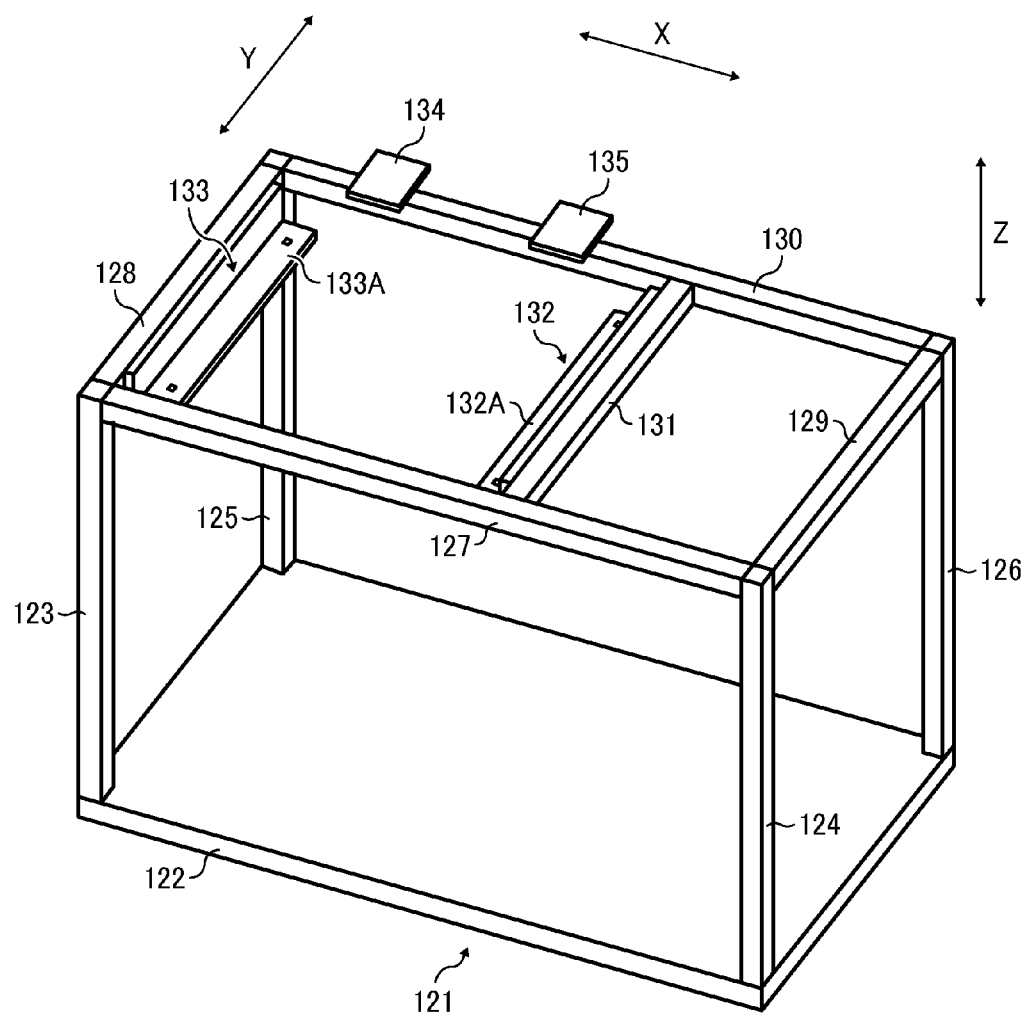
FIG. 2 is a perspective view illustrating an exemplary configuration of an apparatus structure of the image forming apparatus according to one embodiment of the present invention.

Now, an apparatus body 101 of the image forming apparatus according to one embodiment of the present invention is described with reference to FIG. 2. As shown there, the apparatus body 101 is configured by a main body structure 121 and an outer cover, not shown. In the drawing, arrow X indicates a widthwise direction the apparatus body 101 (i.e., the image forming apparatus). Arrow Y indicates a back and forth direction perpendicular to the widthwise direction X in a planar view. Arrow Z also indicates a vertical direction perpendicular to the widthwise direction X in a front view, respectively.

In the main body structure 121, in four corners of a body base 122 having a long rectangular shape in the widthwise direction X, a front left square pillar 123, a right front square pillar 124, a left rear square pillar 125, and a right rear square pillar 126 are fixed in parallel with each other, respectively. An upper front square beam 127 extends between the left front square pillar 123 and the right square pillar 124 in the widthwise direction X and is fixed to the tops of those square pillars 123 and 124, respectively. An upper front square beam 128 also extends between the left front square pillar 123 and the left rear square pillar 125 in the back and forth direction Y and is fixed to the tops of those square pillars 123 and 125, respectively. The upper front square beam 127 and the upper left square beam 128 are fixed making a right angle with each other. The upper front square beam 127 and the upper front square beam 128 also make a right angle with the left front square pillar 123, the right front square pillar 124, the left rear square 125, and the right rear square pillar 126 as well.

Further, an upper right square beam 129 also extends between the right front square pillar 124 and the right rear square pillar 126 in a direction shown by arrow Y and is fixed to the tops of those pillars 124 and 126, respectively. An upper rear square beam 130 also extends between the left rear square pillar 125 and the right rear square pillar 126 in the back and forth direction Y and is fixed to the tops of those pillars 125 and 126, respectively. Further, an upper mid square beam 131 also extends between the upper front square beam 127 and the upper rear square beam 130 in the back and forth direction Y and is fixed to those beams 127 and 130. Accordingly, the upper right square beam 129, the upper rear square beam 130, and the upper mid square beam 131 are fixed in parallel to each other perpendicular to the respective square pillars.

An image reader-mounting unit 132 having an L-shaped a cross section extends in the back and forth direction Y and is fixed to the upper mid squire beam 131. An image reader-mounting unit 133 having an L-shaped cross section also extends in the back and forth direction Y and is pivotally fixed to the upper left squire beam 128. A pair of mounting sections 132A and 133A is provided in the respective image reader mounting units 132 and 133 at the same height (i.e., laying on the same horizontal surface) with each other. To the upper rear square beam 130, multiple ADF-support sections 134 and 135 are fixed at two different positions to be able to attach and support the ADF thereon.

Figure 3:
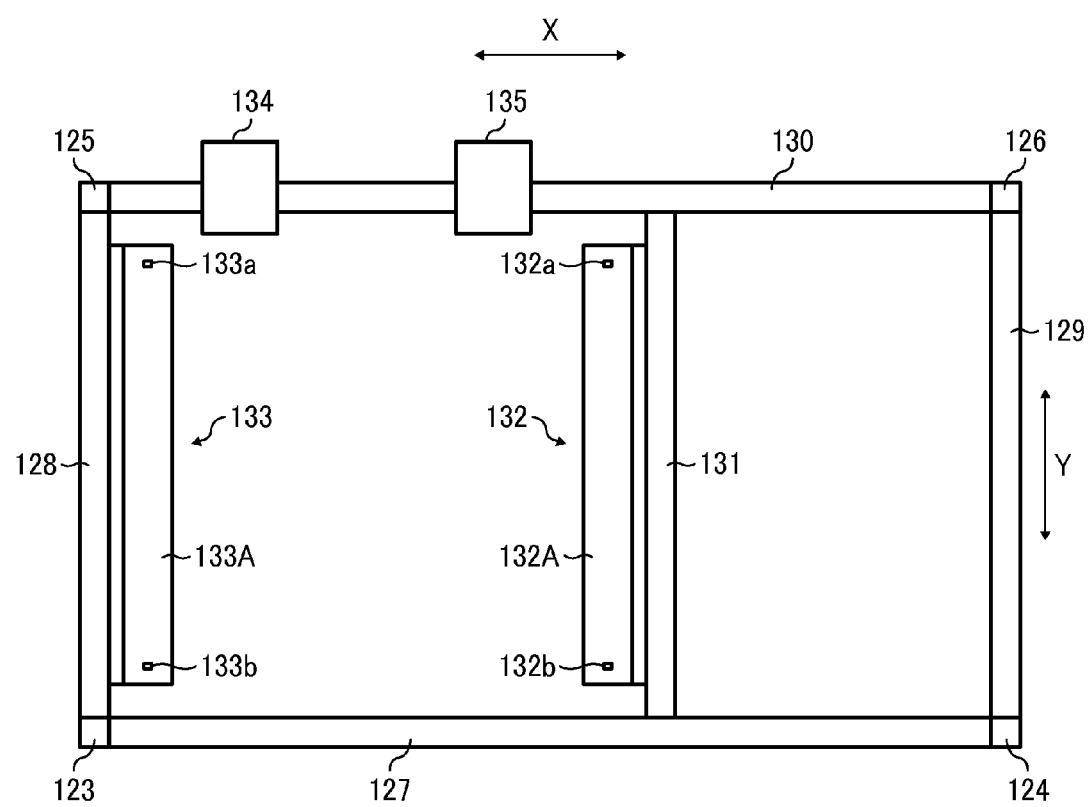
FIG. 3 is a plan view illustrating an exemplary configuration of the apparatus structure of FIG. 2 according to one embodiment of the present invention.
Figure 4:
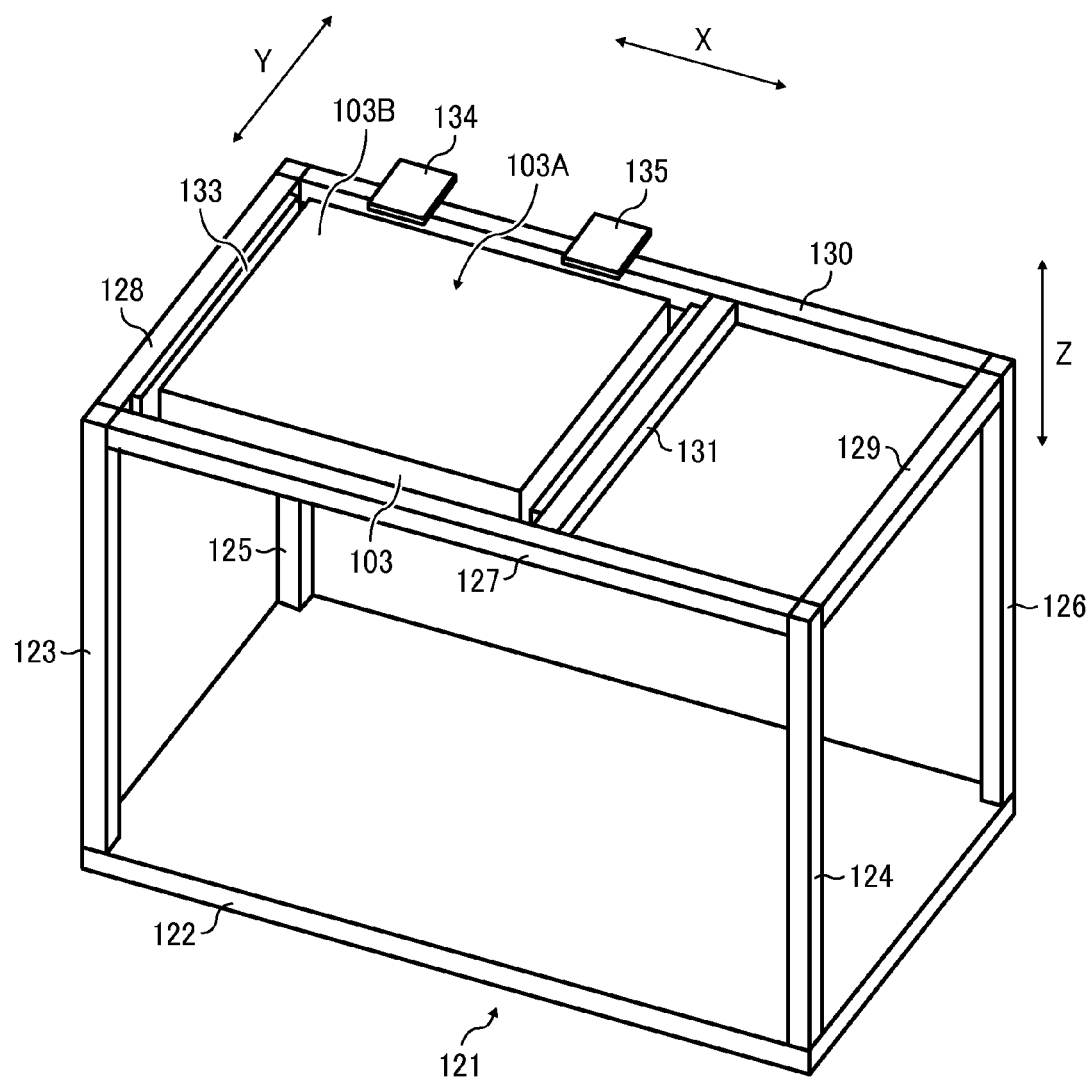
FIG. 4 is a perspective view illustrating the apparatus structure of FIG. 2 with the image reader mounted according to one embodiment of the present invention.

Now, an exemplary configuration of the image reader-mounting unit is described with reference to FIG. 3. In the image reader mounting section 132A of the image reader mounting unit 132, there are provided a pair of pedestal portions 132a and 132b at its both ends in the back and forth direction Y, respectively. Similarly, in the image reader mounting section 133A of the image reader mounting unit 133, there are provided a pair of pedestal portions 133a and 133b at its both ends in the back and forth direction Y, respectively, as well. Thus, the image reading unit 103 is supported at four points of the pedestal portions 132a, 132b, 133a, and 133b, and is accordingly loaded on the image reader mounting sections 132A and 133A of the respective image reader mounting units 132 and 133 as shown in FIG. 4. An image reading surface 103A of the image-reading unit 103 is parallel with the ADF supporters 134 and 135 and is substantially horizontal when the image-reading unit 103 is loaded on the image reader mounting units 132 and 133. The reference number 103B indicates a reading reference point at which the image reading unit 103 starts reading an original document fed by the ADF 104 in main and sub scanning directions. Specifically, in this embodiment, the reading reference point 103B is located in a left rear side of the image-reading unit 103 in the vicinity of the ADF supporting member 134. Accordingly, when a height of the reading reference point 103B for reading the original document largely deviates from a prescribed target value determined based on a position of the ADF supporting members 134 and 135, it can cause an abnormal image.

Herein below, various embodiments each having an exemplary configuration including the parallelism-adjusting unit are described per embodiment with reference to FIGS. 5 to 10. Specifically, as a characteristic configuration of the image forming apparatus according to various embodiments of the present invention, the color image forming apparatus 100 has a parallelism adjusting unit to adjust parallelism (i.e., a tilt) of the reading surface 103A of the image reading unit 103 to improve or reduce skew and a right angle of a read image.

Figure 5:
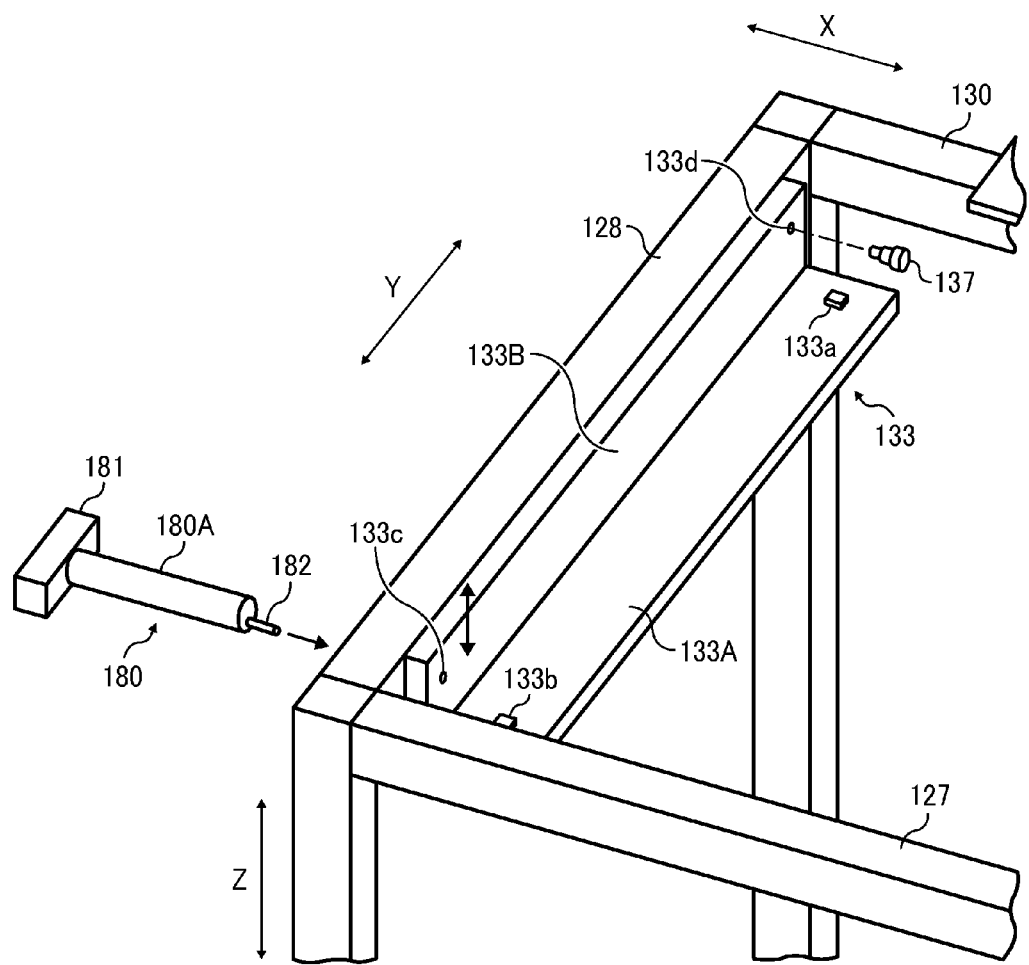
FIG. 5 is an enlarged perspective view illustrating an exemplary configuration of a parallelism-adjusting unit according to a first embodiment of the present invention.
Figure 6:
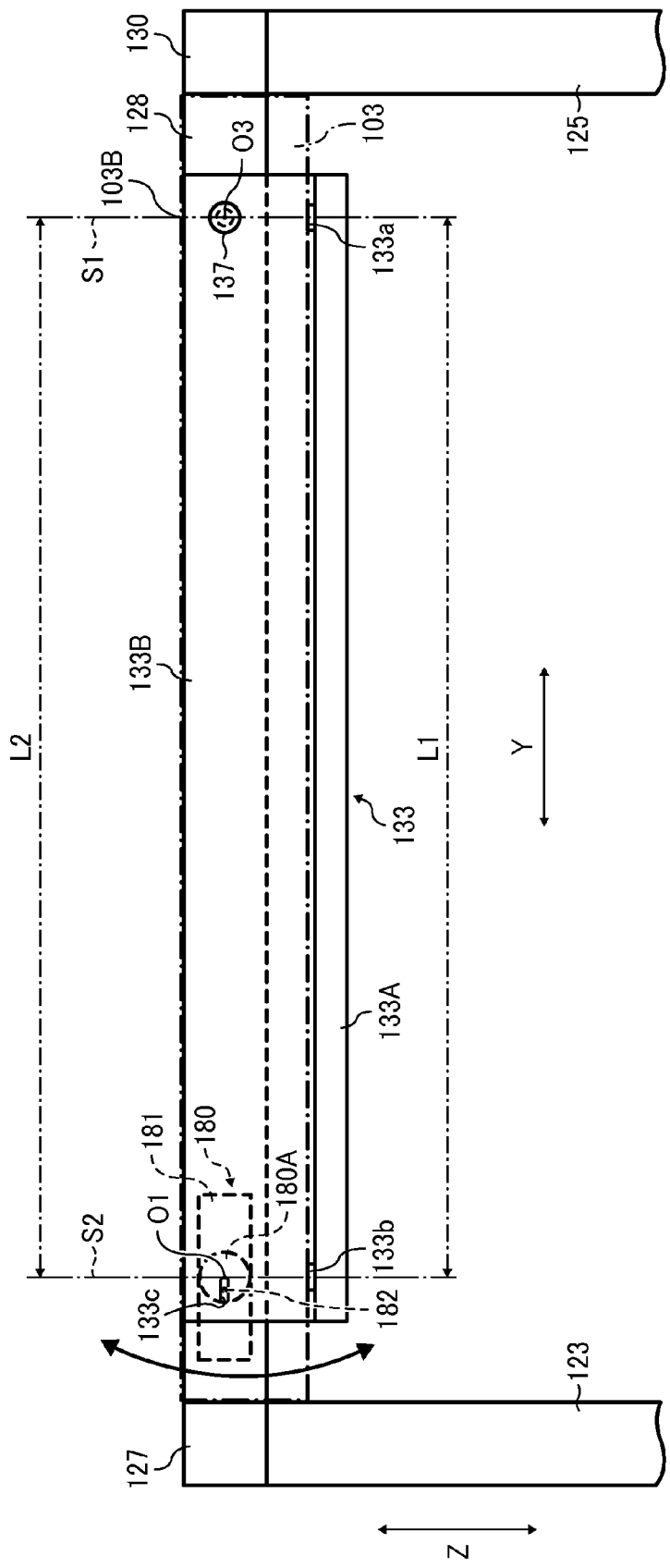
FIG. 6 is a diagram illustrating exemplary adjusting operation executed using the parallelism-adjusting unit to adjust an image reader-mounting unit according to the first embodiment of the present invention.

Initially, a first embodiment of the present invention is described with reference to FIG. 5. As there shown, a pair of holes 133c and 133d is formed penetrating the side rising section 133B of the reader mounting unit 133, which side rising section 133B makes a right angle with the image reader mounting section 133A. As shown in FIG. 6, a hole 133d is located on the same line S1 extended in the direction X as the pedestal portion 133a is located thereon in the back side of the image reader mounting section 133A. Further, into the holes 133c, a stepped screw 137 with a screw at its tip is inserted. The screw of the stepped screw 137 thus screws into a screw hole, not illustrated, formed on the upper left square beam 128 facing the hole 133d, so that the stepped screw 137 attaches the image reader mounting unit 133 to the upper left square beam 128 while freely pivotally supporting the image reader mounting unit 133 around the hole 133d. Further, in this embodiment, the reading reference point 103B is also located on the same line 51 as well as shown in FIG. 6. That is, a pivoting center side of the image reader-mounting unit 133 is placed on the side of the reading reference point at which an original document fed by the ADF is read.

A hole 133c is composed of an oblong hole extending in the back and forth direction Y, and is located on the front side of the apparatus when the hole 133d is formed on the back side of the image forming apparatus. The hole 133c is to located on the same line S2 extended in the direction X as the pedestal portion 133b is positioned thereon. In this embodiment, the hole 133d serving as the pivoting center and the hole 133c located on a power point side are separated by a prescribed length from each other in the back and forth direction Y as one of features of one embodiment of the present invention.

Hence, the side of the hole 133c in the image reader mounting unit 133 can be vertically displaced by less force when compared with a situation in which the holes 133c and 133d are located close to each other or at the same position. In addition, a pivoting angle of the side of the hole 133d decreases in relation to a vertical displacement amount of the side of the hole 133c. Specifically, since the displacement amount of the side of the hole 133c relatively increases in relation to the pivoting angle of the side of the hole 133d, adjustment sensitivity decreases, and accordingly fine adjustment becomes easier while reducing man hours therefor.

Figure 7:
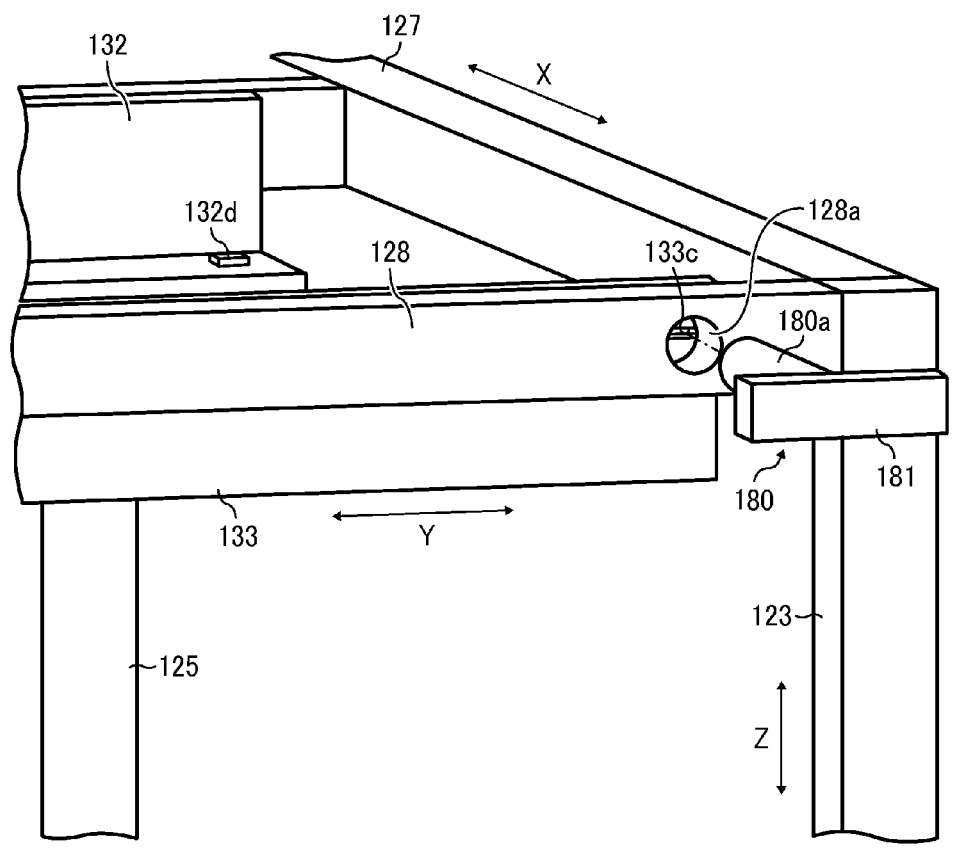
FIG. 7 is an enlarged perspective view taken from outside the parallelism-adjusting unit according to the first embodiment of the present invention.

The parallelism-adjusting unit according to this embodiment is composed of an adjusting jig 180 serving as an operating member operated by an operator. The adjusting jig 180 includes a body shaft 180A as a body, a handle 181 at one end of the body shaft 180A, and a decentering pin 182 in the other end thereof being offset from an axis of the body shaft 180A. Specifically, as shown in FIG. 7, at a section in the upper left square beam 128 facing the hole 133c, an adjustment hole 128a is formed to allow insertion of the body shaft 180A of the adjusting jig 180 therethrough. Specifically, as shown back in FIG. 5, the decentering pin 182 of the adjusting jig 180 enters the hole 133c (i.e., the adjustment oblong hole) after passing through the adjustment hole 128a. Subsequently, by rotating the adjusting jig 180 around its axis in this state, the image reader-mounting unit 133 can be pivoted around the stepped screw 137 as a pivoting center. This rotation of the adjusting jig 180 enables the pedestal portion 133b of the image reader-mounting unit 133 to move up and down. That is, the decentering pin 182 rotates around its axis while engaging with the image reader-mounting unit 133 while contacting an inner wall of the adjustment oblong hole.

Figure 8:
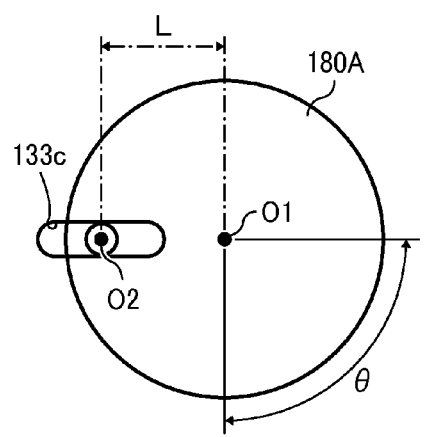
FIG. 8 is a diagram illustrating an exemplary positional relation of a decentering pin that constitutes the parallelism-adjusting unit according to the first embodiment of the present invention.

Thus, the more the stepped screw 137 and the adjusting jig 180 separate from each other the more adjustment sensitivity preferably decreases. For example, when it is supposed that an decentering amount L between an axis O1 of the body shaft 180 A and an axis O2 of the decentering pin 182 is 1 mm, and a rotation angle θ of the adjusting jig 180 is 90 degrees as shown in FIG. 8, while a distance L1 from a center O3 of the stepped screws 137 to a center of the pedestal portion 133b is about 400 mm, and a distance L2 from the center O3 of the stepped screw 137 to the axis center O1 of the adjusting jig 180 is about 100 mm as shown in FIG. 6, a maximum vertical variation amount of the pedestal portion 133b is calculated to be about 4 mm. When the distance L2 is about 400 mm, the maximum vertical variation amount of the pedestal portion 133b becomes about 1 mm.

Further, since the stepped screw 137 and the reading reference point 103B located on the pivoting center side are placed on the side of the ADF supporting member 134, a variation amount of the read reference point 103B in the up-and-down direction can be reduced when the image reader mounting unit 133 pivots during the parallelism adjustment operation. Consequently, by reducing the variation amount to be smaller, the relative positions of the ADF 104 and the reading reference point 103B can be kept substantially constant. Specifically, this can reduce impact on registration and magnification of an image read from the original document fed by the ADF 104.

It is to be noted here that a stopper, not illustrated, maintains the image reader-mounting unit 133 having been subjected to the parallel adjustment by the adjusting jig 180. That is, when the adjusting jig 180 is attached to the upper left square beam 128 (i.e., integral), the stopper preferably inhibits rotation of the adjusting jig 180 after the above-described adjustment operation. Whereas when the operator inserts the adjusting jig 180 into the adjustment hole 128a of the upper left rectangular beam 128 at every adjustment operation ((i.e., not integral)), a position of the image reader mounting unit 133 is preferably regulated and fixed by the stopper after the adjustment operation.

Figure 9A:
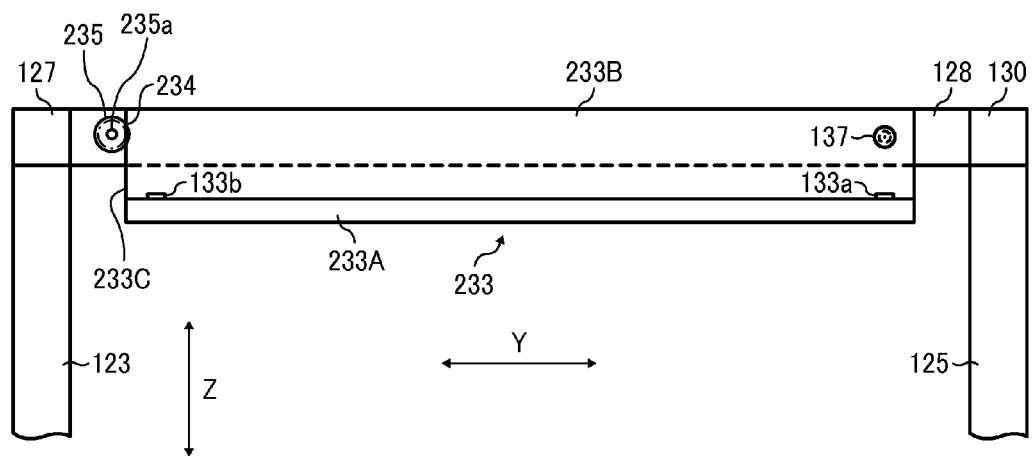
FIG. 9A is a diagram illustrating the entire configuration of a parallelism adjusting unit according to a second embodiment of the present invention.
Figure 9B:
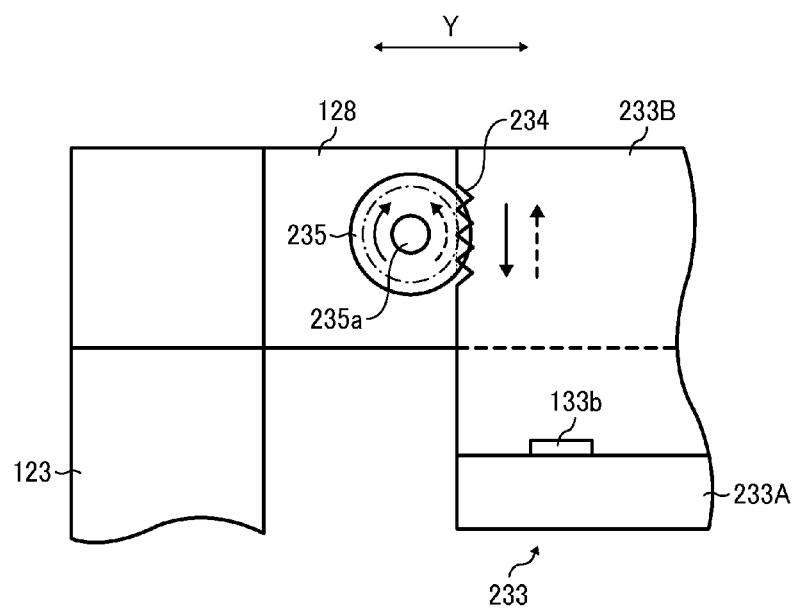
FIG. 9B is a diagram illustrating an aspect of exemplary adjusting operation executed using the parallelism adjusting unit according to the second embodiment of the present invention.

Now, a second embodiment of the present invention is described mainly with reference to FIGS. 9A and 9B. In this embodiment, exemplary configurations of an image reader-mounting unit and a parallelism-adjusting unit described herein below are different from those of the corresponding devices 133 or the like of the first embodiment. That is, according to the second embodiment, as shown in FIGS. 9A and 9B, an image reader mounting unit 233 has an L-shaped section and is disposed in the upper left square beam 128 in parallel with the image reader mounting unit 132 (see, FIG. 3) again. In the image reader mounting section 233A of the image reader mounting unit 233, there are provided a pair of pedestal portions 132a and 132b at its both ends in the back and forth direction Y, respectively, again.

The image reader-mounting unit 233 has the hole 133d formed penetrating the side rising section 233B thereof, which makes a right angle with the image reader mounting section 233A again. Since the stepped screw 137 penetrates the image reader mounting unit 233 and screws into the screw hole, not illustrated, formed on the upper left square beam 128, the image reader mounting unit 233 is attached to the upper left square beam 128 freely pivotally supported around the hole 133d again. In one end (i.e., edge) 233C of the side rising section 233B located on the side of the pedestal portion 132b, a rack 234 composed of vertical continuous teeth is formed. Thus, with this rack 234, an adjusting gear 235 freely rotatably provided and supported by the upper left square beam 128 meshes. In short, the parallelism-adjusting unit is constituted by the rack 234 and the gear 235 in this embodiment of the present invention.

Accordingly, in this embodiment of the present invention, as the gear 235 rotates clockwise in the drawing, the reader supporting member 233 is displaced (i.e., pivots) and descends counterclockwise around the hole 133d serving as the pivoting center. By contrast, as the gear 235 rotates counter clockwise in the drawing, the reader supporting member 233 is displaced (i.e., pivots) and rises clockwise around the hole 133d serving as the pivoting center.

Hence, with the parallelism adjusting unit having the above-described configuration, the pedestal portion 133a disposed in the vicinity of the ADF support sections 134 and 135 and the pedestal portion 133b located on the opposite side thereto can be vertically moved up and down as the gear 235 rotates.

It is note here that the gear 235 can be driven by manually rotating a shaft 235a using a modified adjusting jig prepared by excluding the decentering pin 182 from the adjusting jig described in the first embodiment. In this situation, a stopper to fix a position of the reader-supporting member 233 after the adjustment is necessitated. However, when a motor, not shown, rotates the shaft 235 the stopper can be omitted.

Figure 10:
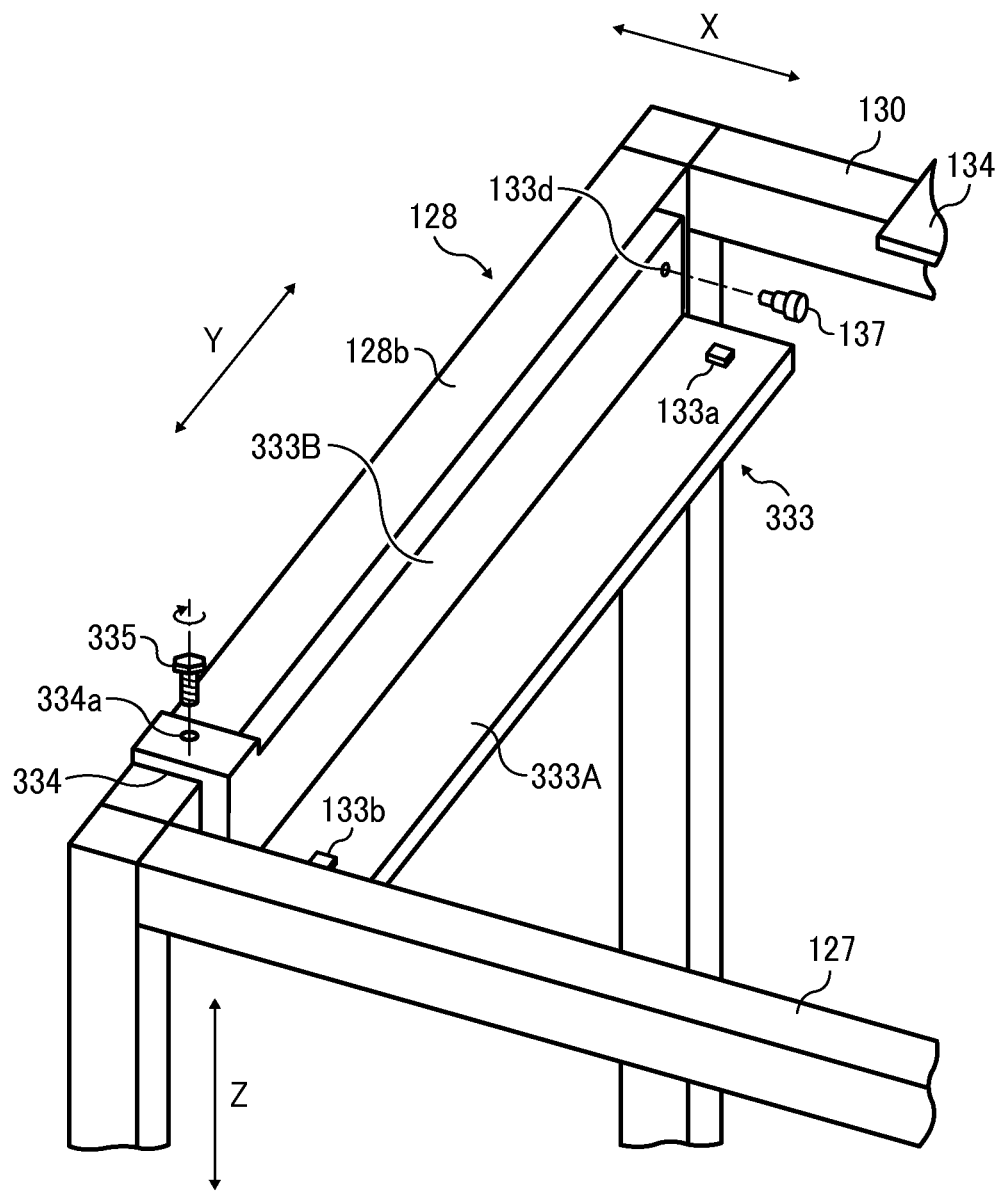
FIG. 10 is an enlarged perspective view illustrating an exemplary configuration and adjusting operation executed using a parallelism-adjusting unit according to a third embodiment of the present invention.

Now, a third embodiment of the present invention is described with reference to FIG. 10. In this embodiment, exemplary configurations of an image reader-mounting unit and a parallelism-adjusting unit described herein below are different from those of the corresponding devices 133 or the like of the first embodiment. Specifically, according to the third embodiment, as shown in FIG. 10, an image reader mounting unit 333 has an L-shaped section and is disposed in the upper left square beam 128 in parallel with the image reader mounting unit 132 (see, FIG. 3) again. Further, in the image reader mounting section 333A of the image reader mounting unit 133, there is provided a pair of pedestal portions 132a and 132b at its both ends in the back and forth direction Y, respectively, again.

The image reader-mounting unit 333 has the hole 133d formed penetrating the side rising section 333B thereof, which makes a right angle with the image reader mounting section 333A again. Since the stepped screw 137 penetrates the image reader-mounting unit 333 and screws into the screw hole, not illustrated, formed on the upper left square beam 128, the image reader-mounting unit 233 is attached to the upper left square beam 128 while it is freely pivotally supported around the hole 133d again. Further, a flange 334 is uniquely provided at the top of the side rising section 333B of the reader-supporting unit 333 on the side of the pedestal portion 132b of the reader-supporting unit 333. The flange 334 is mounted on an upper surface 128b of the upper left square beam 128 from above when assembled. The flange 334 has a screw hole 334a to vertically penetrate the flange 334. Thus, into the screw hole 334a, an adjusting screw 335 screws.

The adjusting screw 335 makes advance and retreat through the screw hole 334 when rotated while contacting and stopping at the upper surface 128b. Thus, by adjusting an amount of projection of the adjusting screw 335 toward the upper surface 128B, the pedestal portion 133b can be vertically moved up and down. Hence, the up-and-down variation amount of the reading reference point 103B can be reduced even when the reader-supporting unit 333 pivots around the stepped screw 137 and the reading reference point 103B. Accordingly, by reducing the up-and-down variation amount of the reading reference point 103B in this way, the relative positions of the ADF 104 and the reading reference point 103B can be kept substantially constant.

Figure 11:
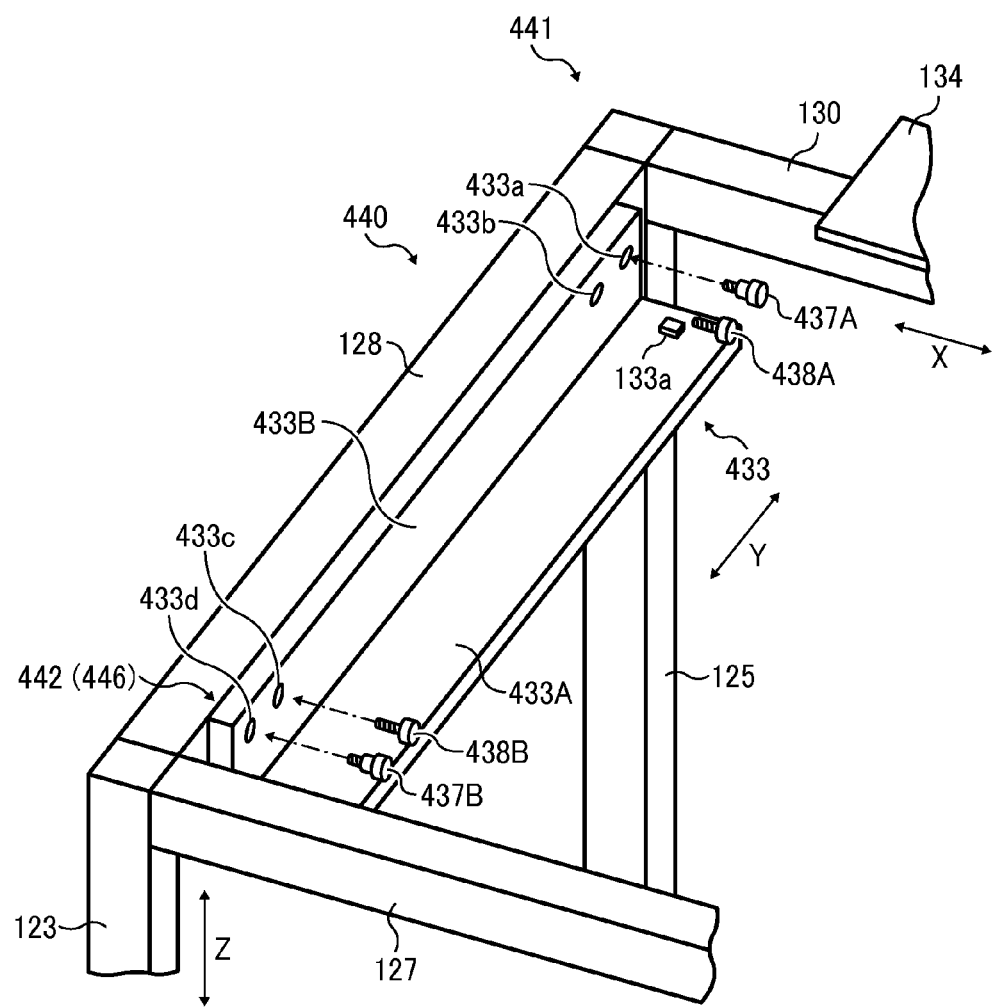
FIG. 11 is an enlarged perspective view illustrating an exemplary configuration of a parallelism-adjusting unit according to a fourth embodiment of the present invention.
Figure 12:
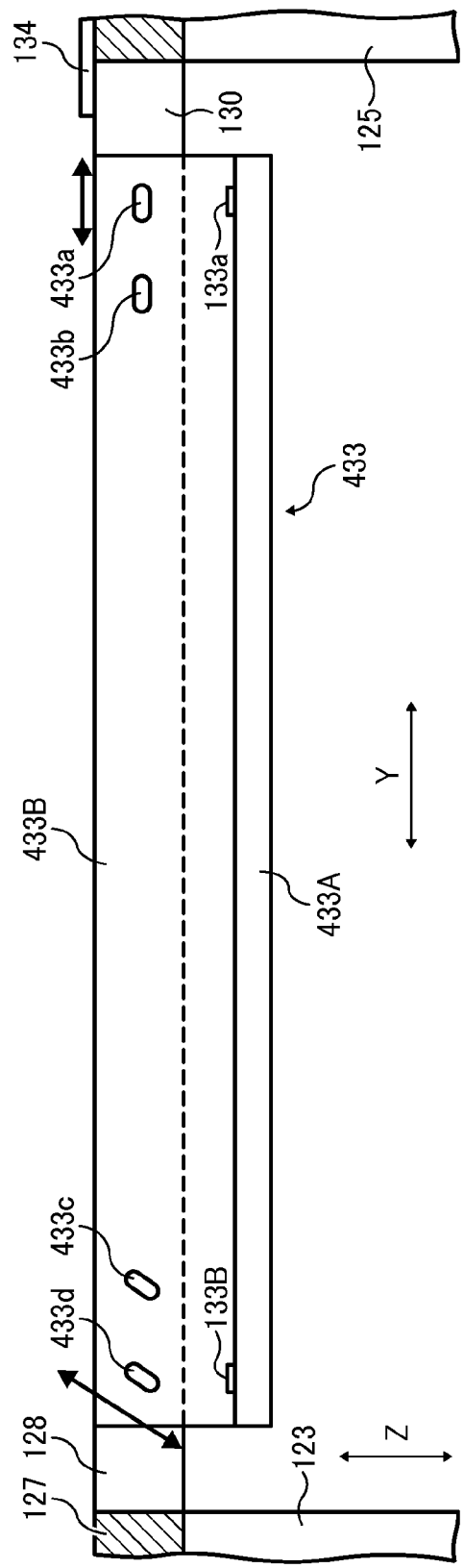
FIG. 12 is an enlarged perspective view illustrating an exemplary configuration of the parallelism adjusting unit taken from inside the color image forming apparatus of the fourth embodiment of the present invention.

Now, a fourth embodiment of the present invention is described mainly with reference to FIGS. 11 and 12. In this embodiment, exemplary configurations of an image reader-mounting unit and a parallelism-adjusting unit described herein below are different from those of the corresponding devices 133 or the like of the first embodiment. Further, a holding unit is newly provided to hold the reader-supporting member when its parallelism has been adjusted by the parallelism-adjusting unit at an adjustment position. Specifically, according to the fourth embodiment, an image reader mounting unit 433 has an L-shaped section and is disposed in the left upper square beam 128 in parallel with the image reader mounting unit 132 (see, FIG. 2) again as shown in FIGS. 11 and 12. Further, in the image reader mounting section 433A of the image reader mounting unit 433, there is provided a pair of pedestal portions 133a and 133b at its both ends in the back and forth direction Y, respectively, again.

The reader mounting unit 433 has a pair of lateral oblong holes 433a and 433b and a pair of slanting oblong holes 433c and 433d, each pair being formed on the respective left and right side edges, penetrating the side rising section 433B thereof making a right angle with the image reader mounting section 433A again. The pair of the lateral oblong holes 433a and 433*b* horizontally extends in the back and forth direction Y. Whereas, the pair of the slant oblong holes 433*c* and 433*d* each has an inclination 81 from a horizontal line extending in the back and forth direction Y. The lateral oblong hole 433*a* and the slanting oblong hole 433*d* are placed on the same line as the pedestal portions 133*a* and 133*b* are placed, respectively. Whereas, the lateral oblong hole 433*b* and the slanting oblong hole 433*c* are positioned inside the lateral oblong hole 433*a* and the slanting oblong hole 433*d* in the back and forth direction Y, respectively. In this embodiment, the pair of lateral oblong holes 433*a* and 433*b* is located on the side of the pedestal portion 133*a*. Whereas, the pair of slanting oblong hole 433*c* and 433*d* is located on the side of the pedestal portion 133*b*. On one side surface of the left upper square beam 128, four screw holes, not shown, are formed facing the lateral oblong holes 433*a* and 433*b* and the slanting oblong holes 433*c* and 433*d*, respectively.

Figure 13:
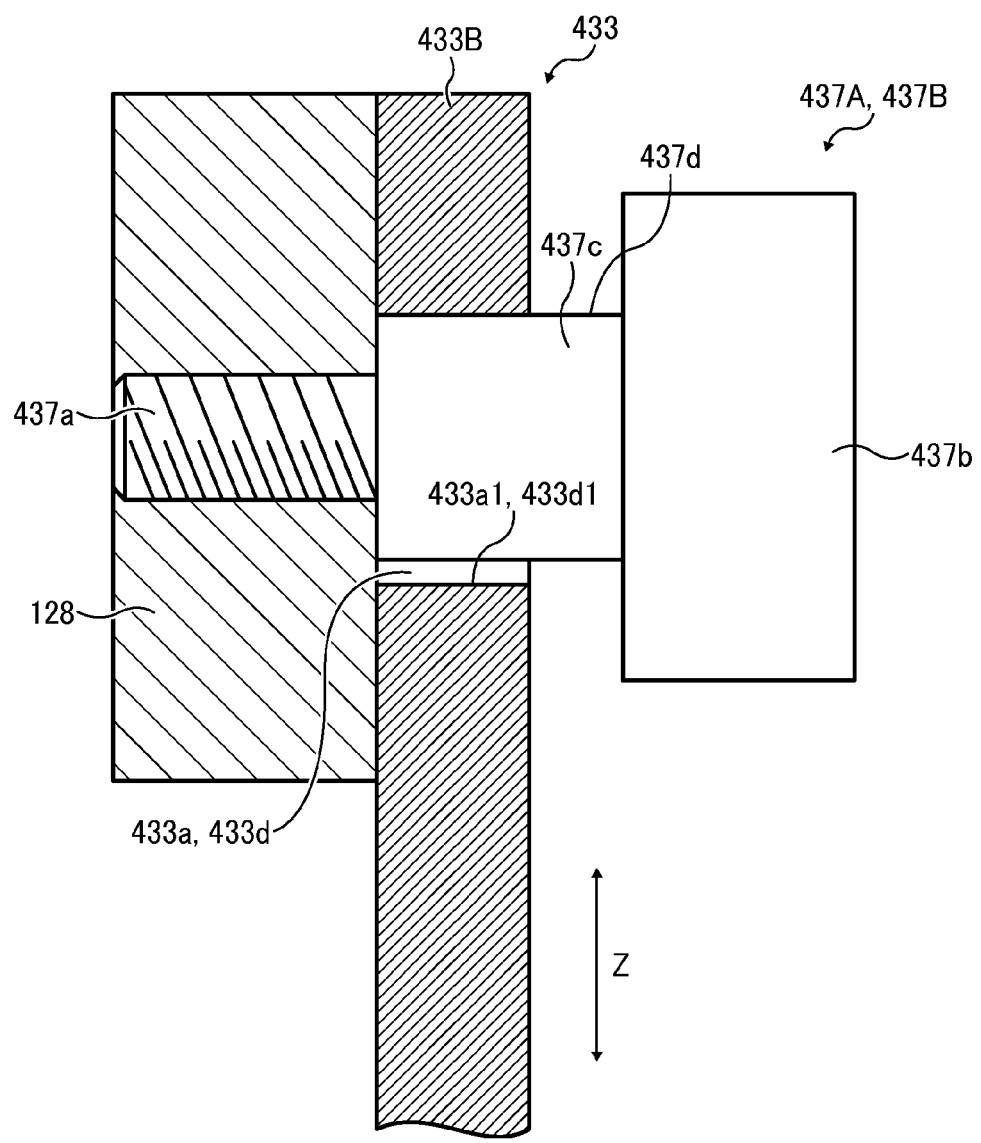
FIG. 13 is enlarged perspective view illustrating an exemplary shape of a guide pin employed in the fourth embodiment of the present invention.

In this embodiment, multiple (i.e., two) stepped screws 437A and 437B are inserted passing through the lateral oblong hole 433*a* and the slanting oblong hole 433*d* as guide pins, respectively. Further, multiple (i.e., two) screws 438*a* and 438*b* are also inserted passing through the lateral oblong hole 433*b* and the slanting oblong hole 433*c* to secure the reader mounting unit 433, respectively. The stepped screws 437A and 437B have the same shape with each other, and as shown in FIG. 13, each includes a handle portion 437*b* having a larger diameter at a base end and a screw portion 437*a* at its tip. At the same time, between the handle portion 437*b* and the screw portion 437*a* there is formed a contact section 437*c* having a small diameter than the handle portion 437*b*. In this embodiment, the lateral oblong hole 433*a* and the stepped screw 437A are provided on the side of the pivoting center of the reader mounting unit 433 to collectively constitute a first supporting unit 441 that freely horizontally moves the reader mounting unit 433. Further, as shown in FIG. 13, the multiple (i.e., two) screws 437A and 437B each includes a stepped screw contact section 437*c* engaging with each of inner surfaces 433*a*1 and 433*d*1 of the lateral oblong hole 433*a* and the slanting oblong hole 433*d*, respectively. Furthermore, a second supporting unit 442 is constituted by the slanting oblong hole 433*d* and the stepped screw 437*b* provided on the other side of the reader mounting unit 433 to resist a downward movement of the reader mounting unit 433. That is, a holding unit 440 is configured by the first and second supporting units 441 and 442. In this embodiment, the lateral oblong hole 433*a* and the stepped screw 437 collectively constituting the first supporting unit 441 serves as a parallelism adjusting unit 446 as well. Further, the pair of slanting oblong holes 443*c* and 443*d* is formed tilting from a direction in which the reader-mounting unit 433 is moved by the first supporting unit 441.

Accordingly, by inserting the stepped screws 437A and 437B into the lateral oblong hole 433*a* and the slanting oblong hole 433*d* and screwing them into the screw holes with their tip screw portions, respectively, the contact sections 437*c* of the stepped screws 437 and 437 contact the inner surfaces of the lateral oblong hole 433*a* and the slanting oblong hole 433*d*, respectively. Consequently, the reader-mounting unit 433 can be movably supported in the up and down direction Z. Subsequently, by similarly inserting the stepped screws 438A and 438B into the lateral oblong hole 433*b* and the slanting oblong hole 433*c* and screwing them into the screw holes with their screw portions, respectively, the reader mounting unit 433 having been subjected to position adjustment in the up and down direction Z can be fixed to the left upper square beam 128. Hence, as the stepped screw 437A enters the lateral oblong hole 433*a* and screws into the screw hole, not shown, formed in the left upper square beam 128, the reader mounting unit 433 can be freely movably attached and supported by the left upper square beam 128 in the back and forth direction Y around the lateral oblong hole 433*a*, into which the stepped screw 437A is inserted. Further, as the stepped screw 437B enters the slanting oblong hole 433*d* and screws into the screw hole, not shown, formed in the left upper square beam 128, a pivoting range of the reader mounting unit 433 pivoting around the side of the lateral oblong hole 433*a*, into which the stepped screw 437A is inserted, is regulated while adjusting a pivoting radius thereof at the same time as well.

Hence, with the above-described configuration, the stepped screw 437A is fastened on the left upper square beam 128 through the lateral oblong hole 433*a* while fastening the stepped screw 437B into the left upper square beam 128 through the slanting oblong hole 433*d*. In such a condition, since the reader mounting unit 433 can move in the horizontal direction (i.e., the back and forth direction Y) and a diagonal direction, in which the slanting oblong hole 433*d* extends, the pedestal portion 133*b* on the left front side can be moved in the up and down direction Z. For example, when a center of the stepped screw 437A is distanced from that of the screw 437B by a length 345 mm as a pitch therebetween, and the inclination 81 of the slanting oblong hole 433*d* from the horizontal direction is 60 degrees, and the reader mounting unit 433 is moved in the back and forth direction Y (i.e., horizontally) by 1 mm with the lateral oblong hole 433*a* being guided by the stepped screw 437A, an amount of vertical displacement (i.e., in the up and down direction Z) of the pedestal portion 133*b* is about 1.7 mm. Hence, by moving the reader-mounting unit 433 in this way, the position of the pedestal portion 133*b* can be adjusted.

Subsequently, after adjustment, the reader mounting unit 433 is fastened on the left upper square beam 128 via the fastening use lateral hole 433*b* and the fastening use slanting oblong hole 433*c* using the fastening screws 438A and 438B, respectively. When it is fastened on the left upper square beam 128, the reader-mounting unit 433 can be continuously held in the vertical direction Z because of friction force generated between the contact section 173*c* of the stepped screw 437B and the slanting oblong hole 433*d*. Hence, a vertical variation (i.e., displacement) of the reading reference position 103 B in the up and down direction Z can be minimized even when the reader mounting unit 433 pivots around the stepped screw 437 and the reading reference position 103B. Accordingly, the positional relation between the ADF 104 and the reading reference position 103 B can be maintained. Further, in this embodiment, since the slanting oblong hole 433*d* and the stepped screw 437B can cooperatively hold the reader mounting unit 433 at an adjusted position, the reader mounting unit 433 does not need to be manually held at the adjustment position when it is fixed to the left upper square beam 128. Thus, workability such as adjusting operation, etc., can be improved while reducing man-hours for the adjustment.

Here, the inclination θ1 of the slanting oblong hole 433*d* from the horizontal line is preferably small in view of keeping a holding condition of the reader-mounting unit 433. However, when it is too small, adjustment sensitivity (i.e., an adjusting amount) becomes too low to obtain a prescribed adjusting displacement. By contrast, when the inclination θ1 of the slanting oblong hole 433*d* from the horizontal line is too much, for example, 90 degrees, a function to hold the reader mounting unit 433 at a prescribed mid position in the vertical direction (i.e., a force prohibiting downward movement in the up and down direction Z) is lost. Hence, as a degree of inclination θ1 desirably exceeds 0 degrees and is 60 degrees or less to be able to hold the reader mounting unit 433 at the prescribed mid position in the vertical direction (i.e., the up and down direction Z) while obtaining the prescribed amount of adjusting displacement. In other words, when the inclination θ1 exceeds 0 degrees, displacement can realize adjustment as needed. Whereas, when the inclination θ1 is 60 degrees or less, the function to hold the reader mounting unit 433 at the prescribed mid position in the vertical direction (i.e., the up and down direction Z) can be obtained.

Figure 14:
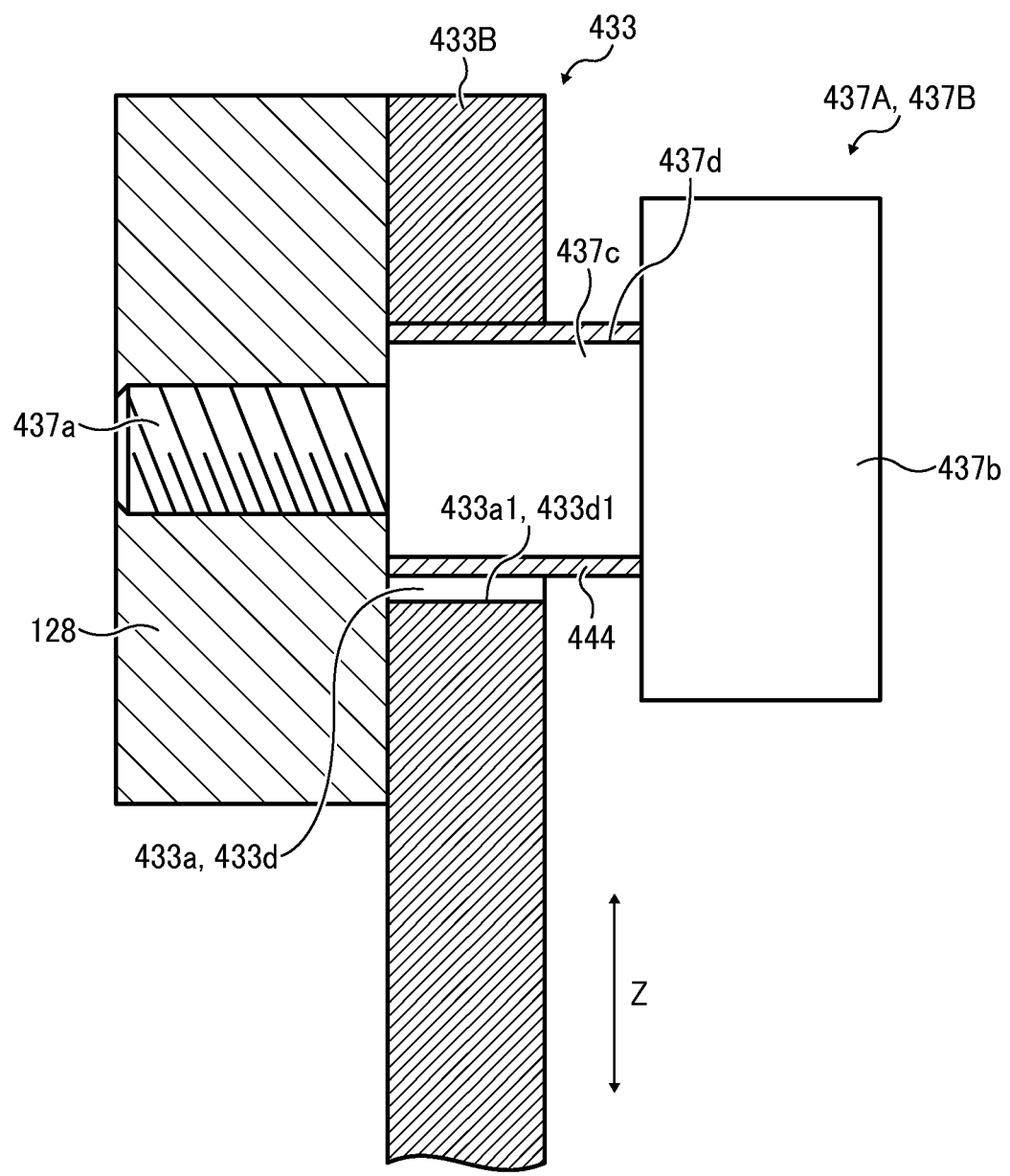
FIG. 14 is enlarged perspective view illustrating an exemplary shape of a guide pin having a friction coefficient increasing section employed in the fourth embodiment of the present invention.

Further, steady holding of the reader mounting unit 433 during the adjustment in the vertical direction (i.e., the up and down direction Z) largely depends on the frictional resistance caused between the slanting oblong hole 433d and the stepped screw 437B. Because of this, a friction coefficient of at least one of the slanting oblong hole 433d and the stepped screw 437B is preferably enhanced. Thus, a friction coefficient increasing section 444 is preferably provided in at least one of the slanting oblong hole 433d and the stepped screw 437B. For example, as shown in FIG. 14, the friction coefficient increasing section 444 is provided and a friction coefficient of the contact section 437c of the stepped screw 437B is enhanced. Consequently, with the enhanced friction coefficient of the contact section 437c of the stepped screw 437B, functionality to hold the reader mounting unit 433 at the prescribed mid position in the vertical direction (i.e., the up and down direction Z) after the adjustment can be more upgraded. By improving the ability to hold the reader mounting unit 433 in the vertical direction in this way, the tilting angle θ1 from the horizontal direction (i.e., in the back and forth direction Y) of the slanting oblong hole 433d can be expanded from 60 degrees up to less than 90 degrees. Further, as an exemplary friction coefficient increasing section 444 to increase the friction coefficient of the contact section 437c1, a different member having a high friction coefficient, such as rubber, a cork, etc., may be preferably attached to (or wound around) a periphery 437d of the contact section 437c. Otherwise, the periphery 437d of the contact section 437c may be roughened to serve as the friction coefficient increasing section 444 by applying knurl cutting or surface texturing, etc.

In the above-described various embodiments, to increase the frictional resistance between the slanting oblong hole 433d and the contact section 437c of the stepped screw 437B, the friction coefficient of the contact section 437c is enhanced as described. However, the system to increase the friction resistance between these two members is not limited to the above-described examples. For example, a different member having a high friction coefficient, such as rubber, a cork, etc., can be attached to an inner surface 433d1 of the slanting oblong hole 433d. Otherwise, the inner surface may be roughened to serve as the friction coefficient increasing section 444. However, in the above-described both of the examples, wear and/or peeling off phenomena may occur. Accordingly, to deal with such a problem, the friction coefficient increasing section 444 is desirably provided rather on the side of the stepped screw 437B to increase the friction coefficient thereof, which is capable of freely separating from the read supporting member 433 and the left upper square beam 128 to be easily interchangeable with another.

According to one aspect of the present invention, since a parallelism adjusting unit is attached to a prescribed site of an image reader mounting unit opposite to a pivoting center site, and accordingly an adjusting side and the pivoting center side is distanced from each other, adjusting sensitivity can be reduced to ease fine adjustment. Further, since a pivoting center side of the image reader-mounting unit is placed on a side of a reading reference point of an automatic document feeder, a reading reference point does not largely deviates, and accordingly the relative positions of the automatic document feeder and the image reader can be maintained constant.

According to another aspect of the present invention, a reading reference point does not largely deviates, and accordingly the relative positions of the automatic document feeder and the image reader can be more readily maintained, because the parallelism-adjusting unit has a de-centering pin to contact and pivot the image reader-mounting unit by rotating around its own axis.

According to yet another aspect of the present invention, a reading reference point does not largely deviates, and accordingly the relative positions of the automatic document feeder and the image reader can be more readily maintained. That is, the parallelism-adjusting unit includes a first gear disposed in the image reader-mounting unit and a second gear freely rotationally supported by the frame, to mesh with the first gear to tilt the image reader-mounting unit.

According to yet another aspect of the present invention, a reading reference point does not largely deviates, and accordingly the relative positions of the automatic document feeder and the image reader can be more readily maintained. That is, the parallelism adjusting unit includes a screw to screw into and penetrate the screw hole and vertically advance and retreat from and to the screw hole while contacting and stopping at a surface of the frame.

According to yet another aspect of the present invention, a reading reference point does not largely deviates, and accordingly the relative positions of the automatic document feeder and the image reader can be more readily maintained, because the parallelism-adjusting unit includes an operating member to rotate the second gear to tilt the image reader mounting.

According to yet another aspect of the present invention, a reading reference point does not largely deviates, and accordingly the relative positions of the automatic document feeder and the image reader can be more readily maintained, because a holding system is provided to hold the image reader-mounting unit adjusted by the parallelism-adjusting unit at a prescribed adjusted position.

According to yet another aspect of the present invention, a reading reference point does not largely deviates, and accordingly the relative positions of the automatic document feeder and the image reader can be more readily maintained. That is, the holding system includes a first supporting unit provided on a side of a pivoting center of the image reader-mounting unit to freely movably support the image reader-mounting unit in the horizontal direction. The holding system further includes a second supporting unit provided on a side opposite the pivoting center of the image reader-mounting unit to resist downward movement of the image reader-mounting unit.

According to yet another aspect of the present invention, a reading reference point does not largely deviates, and accordingly the relative positions of the automatic document feeder and the image reader can be more readily maintained. Because, the second supporting unit includes a slanting oblong hole provided in the image reader-mounting unit, which slants from a moving direction in which the image reader-mounting unit is moved by the first supporting unit. The second supporting unit further includes a guide pin inserted into the slanting oblong hole and contact an inner surface of the slanting oblong hole.

According to yet another aspect of the present invention, a reading reference point does not largely deviates, and accordingly the relative positions of the automatic document feeder and the image reader can be more readily maintained, because an inclination of the slanting oblong hole exceeds 0 degrees and is below 60 degrees when the horizontal line provides 0 degrees.

According to yet another aspect of the present invention, a reading reference point does not largely deviates, and accordingly the relative positions of the automatic document feeder and the image reader can be more readily maintained, because at least one of an outer circumferential surface of the guide pin and an inner surface of the slanting oblong hole has a friction coefficient increased portion.

According to yet another aspect of the present invention, the relative positions of the automatic document feeder and the image reader can be more readily maintained. That is, a method of reducing skew of an image read by an image reader in an image forming apparatus from an original document fed by an automatic document feeder by maintaining relative positions of an image reading reference point to start reading the original document and the image reader using a parallelism adjusting unit is implemented in an image forming apparatus. The image forming apparatus includes a frame, an image forming unit to form a visible image based on the image read by the image reader from the original document, and an image reader-mounting unit pivotally supported by the frame to hold the image reader thereon. The method includes the steps of: operating the parallelism adjusting unit at a side opposite a pivoting center of the image reader mounting unit at a prescribed interval therefrom, which pivoting center is located near the reading reference point in the image reader; pivoting the image reader mounting unit substantially around the reading reference point of the image reader in a prescribed direction; securing the image reader mounting unit at a prescribed pivoting position in which the skew of the image is reduced; reading the original document with the image reader; and forming a visible image with the image forming unit based on the image read from the original document by the image reader.

Numerous additional modifications and variations of the present invention are possible in light of the above teachings. It is therefore to be understood that within the scope of the appended claims, the present invention may be executed otherwise than as specifically described herein. For example, the order of steps for forming the image forming apparatus is not limited to the above-described various embodiments and can be appropriately changed.

What is claimed is:

1. An image forming apparatus comprising:
    a frame;
    an automatic document feeder to feed an original document downstream;
    an image reader to read the original document fed by the automatic document feeder;
    an image forming unit to form a visible image based on an image read by the image reader from the original document;
    an image reader mounting unit to hold the image reader thereon, the image reader mounting unit pivotally supported by the frame; and
    a parallelism adjusting unit to adjust parallelism of the image reader mounting unit;
    wherein the parallelism adjusting unit is disposed on a side opposite a pivoting center for the image reader mounting unit at a prescribed interval therefrom, the pivoting center being located near a reading reference point in the image reader, at which the image reader starts reading the original document.

2. The image forming apparatus as claimed in claim 1, wherein the parallelism adjusting unit comprises a decentering pin to contact and pivot the image reader mounting unit by rotating around its own axis.

3. The image forming apparatus as claimed in claim 1, wherein the parallelism adjusting unit comprising:
    a first gear disposed in the image reader mounting unit; and
    a second gear freely rotationally supported by the frame, to mesh with the first gear to tilt the image reader mounting unit.

4. The image forming apparatus as claimed in claim 1, wherein the parallelism adjusting unit comprises:
    a screw hole vertically formed in the image reader mounting unit; and
    a screw to screw into and penetrate the screw hole, the screw vertically advancing and retreating from and to the screw hole while contacting and stopping at a surface of the frame.

5. The image forming apparatus as claimed in claim 3, wherein the parallelism adjusting unit includes an operating member to rotate the second gear to tilt the image reader mounting unit.

6. The image forming apparatus as claimed in claim 1, further comprising a holding system to hold the image reader mounting unit adjusted by the parallelism adjusting unit at a prescribed adjusted position.

7. The image forming apparatus as claimed in claim 6, wherein the holding system comprises:
    a first supporting unit provided on a side of a pivoting center of the image reader mounting unit to freely movably support the image reader mounting unit in the horizontal direction; and
    a second supporting unit provided on a side opposite the pivoting center of the image reader mounting unit to resist downward movement of the image reader mounting unit.

8. The image forming apparatus as claimed in claim 7, wherein the second supporting unit comprises:
    an slanting oblong hole provided in the image reader mounting unit, the slanting oblong hole slanting from a moving direction in which the image reader mounting unit is moved by the first supporting unit; and
    a guide pin inserted into the slanting oblong hole and contacts an inner surface of the slanting oblong hole.

9. The image forming apparatus as claimed in claim 8, wherein an inclination of the slanting oblong hole exceeds 0 degrees and is below 60 degrees when the horizontal line provides 0 degrees.

10. The image forming apparatus as claimed in claim 8, wherein at least one of an outer circumferential surface of the guide pin and an inner surface of the slanting oblong hole has a friction coefficient increased portion.

11. The image forming apparatus as claimed in claim 10, wherein the inclination of the slanting oblong hole exceeds 0 degrees and is below 60 degrees when the horizontal line provides 0 degrees.

12. An image reading system comprising:
    an automatic document feeder to feed an original document downstream;
    a frame;
    an image reader to read the original document fed by the automatic document feeder;
    an image reader mounting unit pivotally supported by the frame to hold the image reader thereon; and
    a parallelism adjusting unit to adjust parallelism of the image reader mounting unit, wherein the parallelism adjusting unit is disposed on a side opposite a pivoting center for the image reader mounting unit at a prescribed interval therefrom, the pivoting center being located near a reading reference point in the image reader, at which the image reader starts reading the original document.

13. The image reading system as claimed in claim 12, wherein the parallelism adjusting unit comprises a decentering pin to contact and pivot the image reader mounting unit by rotating around its own axis.

14. The image reading system as claimed in claim 12, wherein the parallelism adjusting unit comprises:
   a first gear disposed in the image reader mounting unit; and
   a second gear freely rotationally supported by the frame, to mesh with the first gear to tilt the image reader mounting unit.

15. The image forming apparatus as claimed in claim 12, wherein the parallelism adjusting unit comprises:
   a screw hole vertically provided in the image reader mounting unit; and
   a screw to screw into and penetrate the screw hole, the screw vertically advancing and retreating from and to the screw hole while contacting and stopping at a surface of the frame.

16. The image reading system as claimed in claim 15, wherein the parallelism adjusting unit further comprises an operating member to rotate the second gear to tilt the image reader mounting unit.

17. A method of reducing skew of an image read by an image reader in an image forming apparatus from an original document fed by an automatic document feeder by maintaining relative positions of an image reading reference point to start reading the original document and the image reader using a parallelism adjusting unit,
   the image forming apparatus comprises;
   a frame;
   an image forming unit to form an visible image based on the image read by the image reader from the original document; and
   an image reader mounting unit pivotally supported by the frame to hold the image reader thereon;
   the method comprising the steps of:
   operating the parallelism adjusting unit at a side opposite a pivoting center of the image reader mounting unit at a prescribed interval therefrom, the pivoting center being located near the reading reference point in the image reader;
   pivoting the image reader mounting unit substantially around the reading reference point of the image reader in a prescribed direction;
   securing the image reader mounting unit at a prescribed pivoting position in which the skew of the image is reduced;
   reading the original document with the image reader; and
   forming a visible image with the image forming unit based on the image read from the original document by the image reader.

18. The method as claimed in claim 17, wherein the step of operating the parallelism adjusting unit includes the sub steps of:
   rotating a decentering pin around its own axis while contacting the image reader mounting unit; and
   pivoting the image reader mounting unit.

19. The method as claimed in claim 17, wherein the step of operating the parallelism adjusting unit includes the sub steps of:
   engaging a first gear disposed in the image reader mounting unit with a second gear freely rotationally supported by the frame; and
   tilting the image reader mounting unit by rotating the first and second gears in a prescribed direction.

20. The method as claimed in claim 17, wherein the step of operating the parallelism adjusting unit includes the sub steps of:
   engaging a screw with and penetrating a screw hole vertically formed in the image reader mounting unit;
   contacting and stopping the screw at a surface of the frame; and
   rotating the screw to vertically advance and retreat from and to the screw hole.

* * * * *